United States Patent
Wang

(10) Patent No.: US 9,087,093 B2
(45) Date of Patent: Jul. 21, 2015

(54) METHOD FOR IMPLEMENTING ELECTRONIC BOOKMARKS AND DEVICE THEREOF

(75) Inventor: Huanfu Wang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 13/576,451

(22) PCT Filed: May 16, 2011

(86) PCT No.: PCT/CN2011/074082
§ 371 (c)(1),
(2), (4) Date: Aug. 1, 2012

(87) PCT Pub. No.: WO2012/126195
PCT Pub. Date: Sep. 27, 2012

(65) Prior Publication Data
US 2014/0012809 A1    Jan. 9, 2014

(30) Foreign Application Priority Data

Mar. 23, 2011    (CN) .......................... 2011 1 0070747

(51) Int. Cl.
*G06F 17/30* (2006.01)
*G06F 17/24* (2006.01)

(52) U.S. Cl.
CPC ........ *G06F 17/30345* (2013.01); *G06F 17/241* (2013.01)

(58) Field of Classification Search
CPC .......................... G06F 17/30345; G06F 17/241
USPC .......................................... 707/610; 715/234
See application file for complete search history.

(56) References Cited

U.S. PATENT DOCUMENTS

| | | | | |
|---|---|---|---|---|
| 6,981,210 B2* | 12/2005 | Peters et al. | .................. | 715/234 |
| 8,335,980 B2* | 12/2012 | Cantegrel | ...................... | 715/208 |
| 8,433,995 B1* | 4/2013 | Karam | .......................... | 715/206 |
| 8,453,051 B1* | 5/2013 | Weiss et al. | ................... | 715/240 |

(Continued)

FOREIGN PATENT DOCUMENTS

| | | |
|---|---|---|
| CN | 1950814 A | 4/2007 |
| CN | 101086735 A | 12/2007 |

OTHER PUBLICATIONS

Anh Sung et al.; Machine Translation of CN1950814; published date of Apr. 19, 2007; 10 pages.*

(Continued)

*Primary Examiner* — Monica Pyo
(74) *Attorney, Agent, or Firm* — Ling Wu; Stephen Yang; Ling and Yang Intellectual Property

(57) ABSTRACT

The present invention discloses a method for implementing electronic bookmarks and a device thereof, wherein, the method for implementing electronic bookmarks includes: detecting an operation on a file; and performing a synchronous operation on the bookmark content of the file according to the operation on the file. The present invention synchronously performs processing on the bookmark content after performing an operation on the file, which can implement that the file can still be opened through the bookmark content even if the file is changed; the transformation of terminals is simple, which can be applied to various types of mobile terminals, thereby improving the usability of the mobile terminals and user experience.

2 Claims, 3 Drawing Sheets

(56) References Cited

U.S. PATENT DOCUMENTS

2003/0144984 A1 7/2003 Dunbar
2005/0216526 A1* 9/2005 Kumagai ...................... 707/201
2011/0208614 A1* 8/2011 Tom ............................. 705/27.1

OTHER PUBLICATIONS

International Search Report for PCT/CN2011/074082 dated Dec. 12, 2011.

* cited by examiner

METHOD FOR IMPLEMENTING ELECTRONIC BOOKMARKS AND DEVICE THEREOF

TECHNICAL FIELD

The present invention relates to the technical field of reading electronic books, and in particular, to a method for implementing electronic bookmarks and a device thereof.

BACKGROUND OF THE RELATED ART

The advent of information technology and the Internet age gives people many of emerging and diverse electronic resources. The rise of electronic publications make the reading mode by paper which is spread thousands of years face the impact of the new publishing concept. An electronic book including texts, graphics, images and so on, is a representative of the emerging electronic publications.

At present, mobile terminals such as mobile phones provide a function for displaying an electronic book file, and users can read various electronic books in addition to using the basic function of the mobile terminals, thus bringing the convenience to the users. The electronic books may have hundreds or thousands of pages of content, and the reading cannot be complemented just once. How to locate the last reading position or the favorite segment correctly and quickly needs the usage of electronic bookmarks.

The Chinese patent application whose publication Number is CN200610087976.2 discloses a system for implementing electronic bookmarks, comprising a file monitoring module, which is used to detect the opening status of a file and maintain a list of active files recording the paths and names of the opening files and the paths and names of the corresponding applications; an application state capture module, which is used to acquire the status information of the applications via application program interfaces of an operating system as well as the list of active files, and to take the basic status information of the applications as an electronic bookmark to be stored in an electronic bookmark storage module; an electronic bookmark storage module, which is used to store the electronic bookmarks. The system can further comprises an application status recovery module, and after receiving a recovery command of the file monitoring module, according to the electronic bookmarks stored in the electronic bookmark storage module, a user restores the basic status of the applications via the standard interface functions of the operating system.

The above scheme solves the problem of the application status recovery and locating the file via the electronic bookmarks, however there are the following deficiencies that: the file cannot be opened correctly via the previously stored bookmarks, when the file paths are changed, such as moving, deleting, and renaming.

SUMMARY OF THE INVENTION

The technical problem to be solved by the present invention is to provide a method for implementing electronic bookmarks and a device thereof, which can guarantee that a file is still able to be opened correctly via the bookmarks after the file is manipulated.

In order to solve the aforementioned technical problem, the present invention provides a method for implementing electronic bookmarks, and the method comprises:

detecting an operation on a file; and performing a synchronous operation on bookmark content of the file according to the operation on the file.

Preferably, performing a synchronous operation on the bookmark content of the file refers to updating or deleting the bookmark content of the file.

Preferably, updating the bookmark content of the file comprises:

updating a file path in the bookmark content of the file when the operation on the file is moving the file.

Preferably, updating the bookmark content of the file comprises:

updating a file name in the bookmark content of the file when the operation on the file is renaming the file.

Preferably, deleting the bookmark content of the file comprises:

deleting the bookmark content of the file when the operation on the file is deleting the file.

The present invention also provides a device for implementing electronic bookmarks, and the device comprises: a file management unit and a bookmark management unit, wherein:

the file management unit is configured to detect an operation on a file;

the bookmark management unit is configured to perform a synchronous operation on bookmark content of the file according to the operation on the file detected by the file management unit.

Preferably, the bookmark management unit performing the synchronous operation on the bookmark content of the file is configured to update or delete the bookmark content of the file.

Preferably, the bookmark management unit updating the bookmark content of the file is configured to update a file path in the bookmark content of the file when the operation on the file is moving the file.

Preferably, the bookmark management unit updating the bookmark content of the file is configured to update a file name in the bookmark content of the file when the operation on the file is renaming the file.

Preferably, the bookmark management unit deleting the bookmark content of the file is configured to delete the bookmark content of the file when the operation on the file is deleting the file.

In summary, the present invention synchronously processes the bookmark content after performing an operation on the file, which can implement opening the file through the bookmark content even if the file is changed, and the transformation of terminals is simple, which can be applied to various types of mobile terminals, thereby improving the usability of the mobile terminals and user experience.

PREFERRED EMBODIMENTS OF THE PRESENT INVENTION

Taking into account the changes of a file path or file name and so on, if the bookmark content can be updated synchronously to make the bookmark content point to the correct file, the file can still be opened correctly according to the bookmark content, which will be very helpful for improving the usability of the 3G mobile terminals and user experience.

In a method for implementing electronic bookmarks in the embodiment of the present invention, the bookmark content is updated or deleted synchronously according to the specific operation types when the file is manipulated, such as moving, deleting or renaming and so on, so that the file can still be opened correctly according to the changed bookmark content.

The embodiment of the present invention also discloses a device for implementing electronic bookmarks, and the device comprises: a file management unit, a file storage unit, a bookmark management unit, and a bookmark storage unit, wherein:

the file management unit is configured to manage files on a mobile terminal and detect the type of an operation on the file and send a notification message, the content of which comprises an operation type, a file name and file path before the operation as well as a file name and file path after the operation, to the bookmark management unit when performing an operation on the file;

the file storage unit is configured to store the files on the mobile terminal;

the bookmark management unit is configured to manage the bookmark content so as to implement a creation and a recovery of the bookmark and receive the notification message of the file management unit and update or delete the bookmark content according to the message content;

the bookmark storage unit is configured to store the bookmark content.

The bookmark content may comprise: a file name, a file path, a locating position, description information and display status information and so on. The bookmark content is stored in a file, and the operation can be performed on the bookmark content, such as searching, viewing, editing and so on. Plenty of the bookmark content can be stored in the same file in the bookmark storage unit.

The present invention will be illustrated in detail in combination with accompanying drawings hereinafter.

Figure 1:
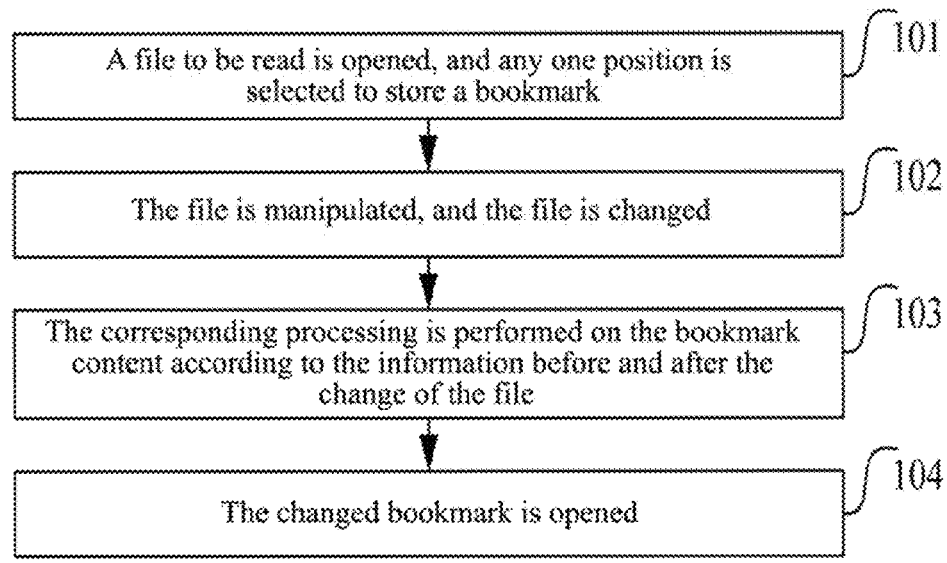
FIG. 1 is a flow chart of a method for implementing electronic bookmarks according to the embodiment of the present invention.

FIG. 1 is a flow chart of a method for implementing electronic bookmarks according to the embodiment of the present invention, and the method comprises the following steps.

In step 101, a file to be read is opened, and any one position is selected to store a bookmark;

the number of the bookmarks can be limited, and adding a new bookmark or replacing the currently existing bookmark by means of covering can be selected when a bookmark is added.

In step 102, the file is manipulated, and the file is changed;

the operation on the file can comprise moving, deleting and renaming and so on, and operations of these types will result in the situations, such as the change of a file name and a file path, or the disappearance of the file and so on.

A notification message of changing the file will be sent after the file is changed; and the notification message comprises an operation type, information before and after the change of the file, such as the file name and the file path before and after the change and so on.

In step 103, a synchronous operation on the bookmark content is performed according to the information before and after the change of the file.

The synchronous operation on the bookmark content refers to an update or a deletion of the bookmark content.

In step 104, the changed bookmark is opened.

Opening the bookmark refers to acquiring the information in the bookmark, such as the file name, file path and file display position and so on, and the file can be opened correctly according to the information.

Figure 2:
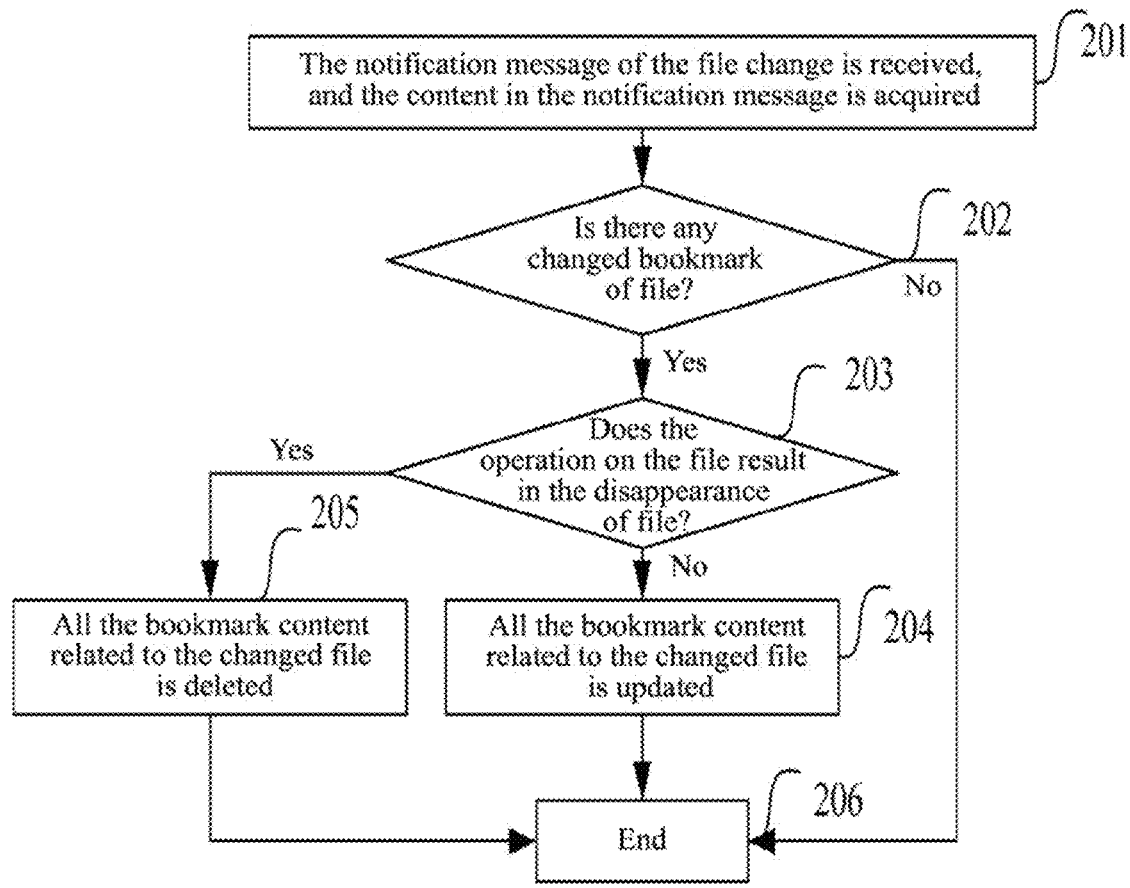
FIG. 2 is a flow chart for performing a synchronous operation on the bookmark content in a method according to the embodiment of the present invention.

FIG. 2 refers to performing a synchronous operation on the bookmark content in the embodiment of the present invention, and the steps of the synchronous operation comprise:

in step 201, the notification message of changing the file is received, and the content in the notification message is acquired;

in step 202, the currently stored bookmark content is traversed, and it is judged whether there is a changed bookmark of the file, if yes, proceed to step 203; otherwise, skip to step 206;

in step 203, it is judged whether the operation on the file results in the disappearance of the file according to the operation type, if yes, skip to step 205; otherwise, proceed to step 204;

in step 204, all the bookmark content related to the changed file is updated according to the information before and after the file change in the notification message; skip to step 206;

the content to be updated is different due to the different operations on the file, for example, a renaming operation needs to update the file name, and a moving operation needs to update the file path;

in step 205, all the bookmark content related to the changed file is deleted;

the step is needed to be executed when the file disappears or the file cannot be opened due to damage.

in step 206, the process is ended.

Figure 3:
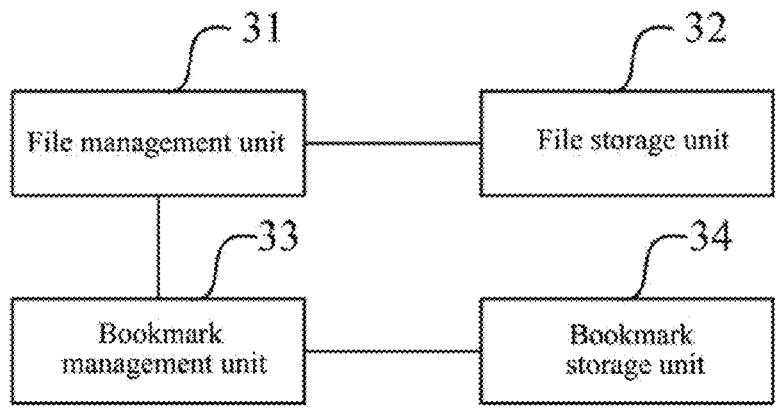
FIG. 3 is a structural diagram of a device for implementing electronic bookmarks according to the embodiment of the present invention.

FIG. 3 is a device for implementing electronic bookmarks in the embodiment of the present invention, and the device comprises: a file management unit 31, a file storage unit 32, a bookmark management unit 33 and a bookmark storage unit 34, wherein:

the file management unit is configured to manage files on a mobile terminal and detect the type of an operation on the file and send a notification message, the content of which comprises an operation type, a file name and file path before the operation as well as a file name and file path after the operation, to the bookmark management unit when performing an operation on the file;

the file storage unit is configured to store the files on the mobile terminal;

the bookmark management unit is configured to manage the bookmark content so as to implement a creation and a recovery of the bookmark and to receive the notification message of the file management unit and update or delete the bookmark content according to the message content;

the bookmark storage unit is configured to store the bookmark content.

Figure 4:
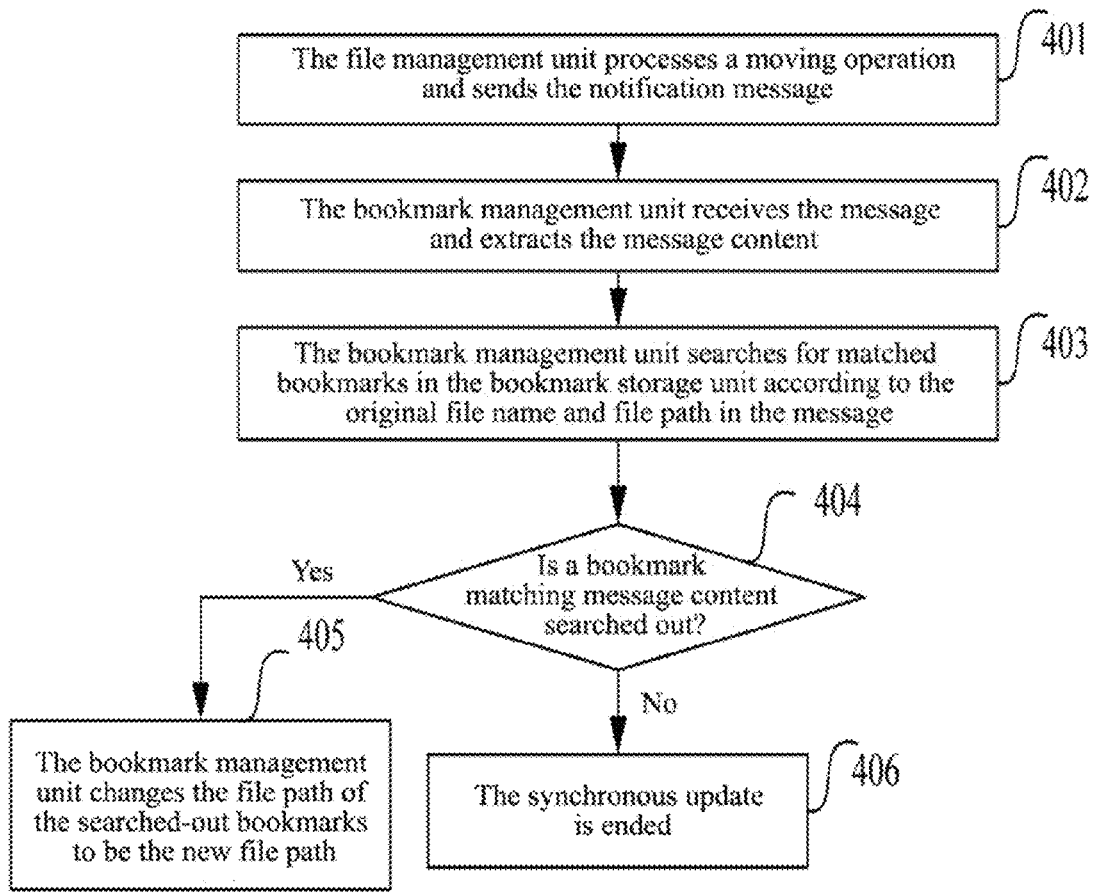
FIG. 4 is a flow chart of an example of performing a moving operation on a file according to the embodiment of the present invention.

FIG. 4 is a flow chart of an example of performing a moving operation according to the embodiment of the present invention, comprising the following steps:

in step 401, the file management unit processes a moving operation, for example, the manipulated file name is abc.txt, and the original file path is \Folder_Current\abc.txt; the notification message is sent when the file is moved to \Folder_Dest, and the message content comprises that the operation type is MOVE, the original file name is abc.txt, the original file path is \Folder_Current\abc.txt, the new file name is abc.txt and the new file path is \Folder_Dest\abc.txt;

in step 402, the bookmark management unit receives the message and extracts the message content;

in step 403, the bookmark management unit searches for matched bookmarks in the bookmark storage unit according to the original file name and file path in the message;

in step 404, the bookmark management unit judges whether to search out the bookmarks matching the message content or not, and if yes, there is a bookmark of abc.txt in the bookmark storage unit, proceed to step 405; otherwise, there is not any bookmark of abc.txt in the bookmark storage unit, skip to step 406;

in step 405, the bookmark management unit changes the file path of the searched-out bookmarks to be the new file path \Folder_Dest\abc.txt, and then the operation is ended;

in step 406, the synchronous update is ended.

Figure 5:
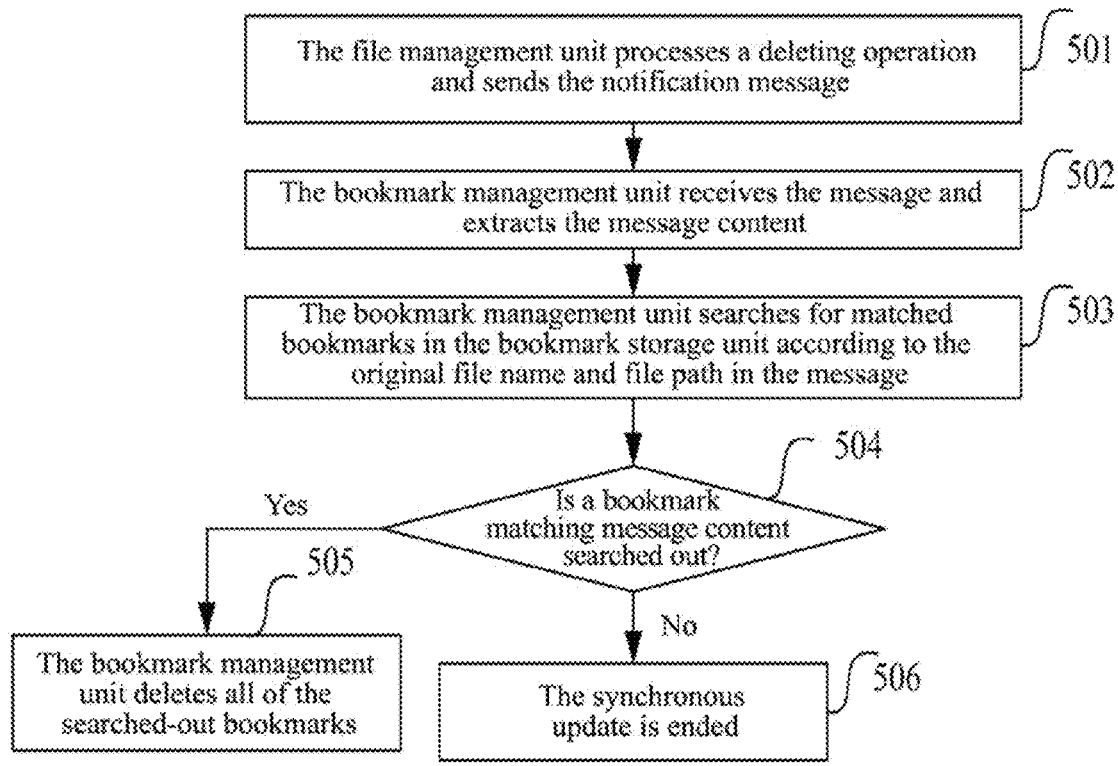
FIG. 5 is a flow chart of an example of performing a deleting operation on a file according to the embodiment of the present invention.

FIG. 5 is a flow chart of an example of performing a deleting operation according to the embodiment of the present invention, comprising the following steps:

in step 501, the file management unit processes a deleting operation, for example, the manipulated file name is abc.txt, and the file path is \Folder_Current\abc.txt; the notification message is sent, and the message content comprises that the operation type is DELETE, the original file name is abc.txt, the original file path is \Folder_Current\abc.txt, the new file name is set as null, and the new file path is set as null;

in step 502, the bookmark management unit receives the message, and extracts the message content;

in step 503, the bookmark management unit searches for matched bookmarks in the bookmark storage unit according to the original file name and original file path in the message;

in step 504, the bookmark management unit judges whether to search out the bookmarks matching the message content, and if yes, there is a bookmark of abc.txt in the bookmark storage unit, proceed to step 505; otherwise, there is not any bookmark of abc.txt in the bookmark storage unit, skip to step 506;

in step 505, the bookmark management unit deletes all of the searched-out bookmarks, and then the operation is ended;

in step 506, the synchronous update is ended.

Figure 6:
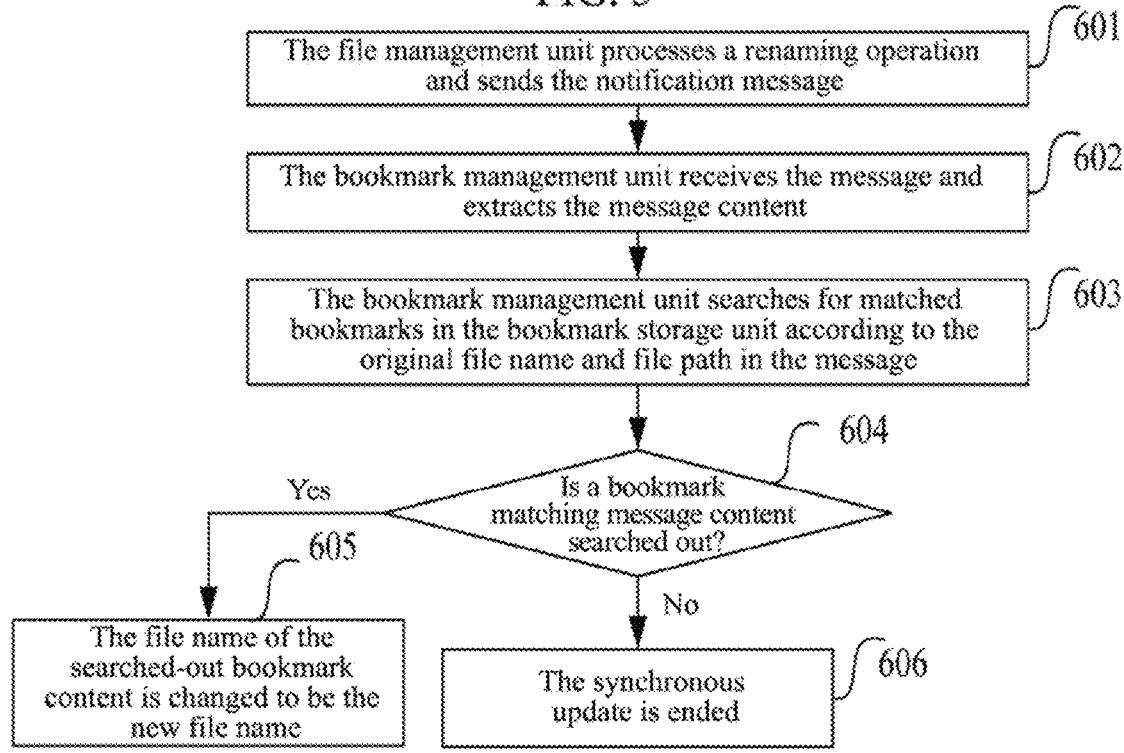
FIG. 6 is a flow chart of an example of performing a renaming operation on a file according to the embodiment of the present invention.

FIG. 6 is a flow chart of an example of performing a renaming operation according to the embodiment of the present invention, comprising the following steps:

in step 601, the file management unit processes a renaming operation, for example, the manipulated file name is abc.txt, and the original file path is \Folder_Current\abc.txt and the file is renamed as abc_new.txt, and the notification message is sent and the message content comprises that the operation type is RENAME, the original file name is abc.txt, the original file path is \Folder_Current\abc.txt, the new file name is abc_new.txt and the new file path is \Folder_Current\abc_new.txt;

in step 602, the bookmark management unit receives the message and extracts the message content;

in step 603, the bookmark management unit searches for matched bookmarks in the bookmark storage unit according to the original file name and original file path in the message;

in step 604, the bookmark management unit judges whether to search out the bookmarks matching the message content, and if yes, there is a bookmark of abc.txt in the bookmark storage unit, proceed to step 605; otherwise, there is not any bookmark of abc.txt in the bookmark storage unit, skip to step 606;

in step 605, the file name of the searched-out bookmark content is changed to be the new file name of abc_new.txt, and then the operation is ended;

in step 606, the synchronous update is ended.

The method and the device of the present invention can be widely used in various terminal devices, such as mobile phones and so on.

Obviously, those skilled in the field should understand that each module and each step of the aforementioned present invention can be implemented with universal computing devices; they are integrated in a single computing device, alternatively they are distributed in a network composed of a plurality of the computing devices; optionally, they can be implemented with program codes executed by the computing devices, so that they can be stored in storage devices to be executed by the computing device, or they are made into various integrated circuit modules, alternatively a plurality of modules or steps are made into a single integrated circuit module for implementation. Thus the present invention is not limited to any specific combination of hardware and software.

The above description is only the embodiments of the present invention, and is not intended to limit the present invention. For those skilled in the field, the present invention can be modified or changed. All modifications, equivalents and improvements and so on, which are made without departing from the spirit and essence of the present invention, should be included within the protection scope of the present invention.

INDUSTRIAL APPLICABILITY

The method for implementing electronic bookmark and a device provided by the present invention synchronously process the bookmark content after performing an operation on the file, which implements that the file can still be opened through the bookmark content even if the file is changed; the transformation of terminals is simple, which can be applied to various types of mobile terminals, thereby improving the usability of the mobile terminals and user experience.

What is claimed is:

1. A method for implementing bookmarks of electronic book files, comprising:

detecting, by a file management unit in a terminal device, an operation on an electronic book file on the terminal device;

sending, by the file management unit to a bookmark management unit in the terminal device, a notification message notifying change of the electronic book file, the notification message comprising a type of the operation on the electronic book file, a file name of the electronic book file before the change, a file path of the electronic book file before the change, a file name of the electronic book file after the change and a file path of the electronic book file after the change;

the bookmark management unit receiving the notification message and searching for a matched bookmark in a bookmark storage unit in the terminal device according to the file name of the electronic book file before the change and the file path of the electronic book file before the change in the notification message; and when the matched bookmark is found, updating, by the bookmark management unit, a file path in the content of the matched bookmark of the electronic book file, updating, by the bookmark management unit, a file name in the content of the matched bookmark of the electronic book file or deleting, by the bookmark management unit, the matched bookmark of the electronic book file, so as to update or delete the bookmark of the electronic book file in accordance with the change of the electronic book file.

2. A device for implementing bookmarks of electronic book files, comprising: a file management unit and a bookmark management unit in a terminal device, wherein:

the file management unit is configured to detect an operation on an electronic book file on the terminal device; and send to the bookmark management unit a notification message notifying change of the electronic book file, the notification message comprising a type of the operation on the electronic book file, a file name of the electronic book file before the change, a file path of the electronic book file before the change, a file name of the electronic book file after the change and a file path of the electronic book file after the change;

the bookmark management unit is configured to receive the notification message and search for a matched bookmark in a bookmark storage unit in the terminal device according to the file name of the electronic book file before the change and the file path of the electronic book file before the change in the notification message; and when the matched bookmark is found, update a file path in the content of the matched bookmark of the electronic book file, update a file name in the content of the matched bookmark of the electronic book file or delete the matched bookmark of the electronic book file, so as to update or delete the bookmark of the electronic book file in accordance with the change of the electronic book file.

* * * * *